(12) United States Patent
Gasparini et al.

(10) Patent No.: US 10,418,793 B2
(45) Date of Patent: Sep. 17, 2019

(54) SWITCHING DEVICE OF THE WITHDRAWABLE TYPE

(71) Applicant: ABB Schweiz AG, Baden (CH)

(72) Inventors: Gabriele Gasparini, Azzano San Paolo (IT); Gianluca Cortinovis, Albino (IT); Giorgio Moriconi, Torre Boldone (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/759,906

(22) PCT Filed: Aug. 4, 2016

(86) PCT No.: PCT/EP2016/068688
§ 371 (c)(1),
(2) Date: Mar. 14, 2018

(87) PCT Pub. No.: WO2017/045838
PCT Pub. Date: Mar. 23, 2017

(65) Prior Publication Data
US 2018/0241183 A1      Aug. 23, 2018

(30) Foreign Application Priority Data

Sep. 14, 2015 (EP) ..................................... 15185048

(51) Int. Cl.
*H02B 11/133* (2006.01)
*H02B 11/167* (2006.01)
*H02B 11/24* (2006.01)

(52) U.S. Cl.
CPC ........... *H02B 11/24* (2013.01); *H02B 11/133* (2013.01); *H02B 11/167* (2013.01)

(58) Field of Classification Search
CPC ............ H01H 9/22; H01H 9/24; H01H 71/52; H01H 71/526; H01H 71/505; H02B 11/24; H02B 11/167; H02B 11/127
See application file for complete search history.

(56) References Cited

U.S. PATENT DOCUMENTS 6,031,191 A * 2/2000 Ahlert .................... H02B 11/24
200/50.21
6,727,442 B2 * 4/2004 Byron .................. H01H 31/003
200/400

(Continued)

FOREIGN PATENT DOCUMENTS

CN    202217954 U    5/2012
CN    103066520 A    4/2013

(Continued)

OTHER PUBLICATIONS

JP 2002-335610, Toba, et al., Nov. 2002. Machine translation.*

(Continued)

*Primary Examiner* — Kyung S Lee
(74) *Attorney, Agent, or Firm* — Taft Stettinius & Hollister LLP; J. Bruce Schelkopf

(57) ABSTRACT

A switching device including a switching unit with one or more electric poles having an insulating casing. The switching device is reversibly movable between an insertion position, at which said switching unit is electrically connected with an electric line, and a withdrawal position, at which said switching unit is electrically disconnected from said electric line. One or more actuating elements may be operatively coupleable with an actuating mechanism of a shutter device to operate one or more shutters of the shutter device during the movement of the switching device. The actuating elements may be fixed to the switching unit. At least one of the actuating elements includes a first mechanical connection with the insulating casing of at least one of the electric poles, and the insulating casing of at least one of the electric poles includes a second mechanical connection with at least one of the actuating elements.

18 Claims, 9 Drawing Sheets

(56) References Cited

U.S. PATENT DOCUMENTS

| | | | | |
|---|---|---|---|---|
| 7,067,747 B2* | 6/2006 | Deylitz | ............... | H02B 11/24 200/50.21 |
| 7,440,259 B1* | 10/2008 | Deylitz | ............... | H02B 11/24 200/50.21 |
| 8,796,569 B2* | 8/2014 | Kutsche | ............... | H02B 11/24 200/50.22 |
| 2012/0228095 A1* | 9/2012 | Kutsche | ............... | H02B 11/24 200/50.22 |
| 2012/0261239 A1* | 10/2012 | Kim | ............... | H02B 11/24 200/304 |
| 2012/0264315 A1 | 10/2012 | Wilkie et al. | | |

FOREIGN PATENT DOCUMENTS

| | | | |
|---|---|---|---|
| CN | 103460533 A | 12/2013 | |
| CN | 103548221 A | 1/2014 | |
| EP | 2493038 A1 | 8/2012 | |
| JP | 2002335610 A | 11/2002 | |
| WO | 2012120012 A1 | 9/2012 | |

OTHER PUBLICATIONS

European Patent Office, International Search Report & Written Opinion issued in corresponding Application No. PCT/EP2016/068688, dated Oct. 27, 2016, 12 pp.

European Patent Office, Extended Search Report issued in corresponding Application No. 15185048.4, dated Feb. 12, 2016, 8 pp.

Chinese Patent Office, "Chinese Office Action", dated Jun. 11, 2019, 10 pages. Beijing, China.

\* cited by examiner

SWITCHING DEVICE OF THE WITHDRAWABLE TYPE

The present invention relates to the field of switching devices (such as circuit breakers, contactors, disconnectors and the like) for low voltage or medium voltage applications.

For the purposes of the present application, the term "low voltage" (LV) relates to operating voltages lower than 1 kV AC and 1.5 kV DC whereas the term "medium voltage" (MV) relates to operating voltages higher than 1 kV AC and 1.5 kV DC up to some tens of kV, e.g. up to 72 kV AC and 100 kV DC;

Switching devices are widely used in LV or MV applications.

Switching devices for LV or MV applications may be of fixed type or withdrawable type.

A switching device of the withdrawable type typically comprises a switching unit mounted on a track movable with respect to a supporting base of the electric switchgear panel, in which the switching device is installed.

Thanks to the movable truck, the switching device is movable between an insertion position, at which the switching unit is electrically connected with an electric line, and a withdrawal position, at which the switching unit is electrically disconnected from the electric line.

Typically, in an electric switchgear panel, a withdrawable switching device is operatively associated with a shutter device.

The shutter device comprises one or more shutters to provide a suitable segregation of the switching device when this latter is in the withdrawal position.

To this aim, the shutters of the shutter device must be moved in coordination with the movement of the switching device.

Many withdrawable switching devices of known type are provided with a pair of actuating chutes operatively coupleable with an actuating mechanism of the shutter device to operate the shutters during the movement of the switching device.

Typically, in currently available withdrawable switching devices, the actuating chutes are mechanically connected with the movable truck and with the supporting frame of the switching unit of the switching device.

A drawback of this solution consists in that the installation of the actuating chutes is relatively difficult and time-consuming.

A further drawback consists in that the distances between the actuation chutes and the terminals of the switching unit may vary due to the mechanical tolerances related to the mounting of the switching unit on the movable truck.

An uncontrollable variability of the dielectric distances between the powered and earthed portions of the switching device may have negative consequences in terms of safety, as uncontrolled electric discharges may occur when the switching device is electrically connected with the electric line.

To avoid these problems, very often, it is necessary to provide the terminals of the switching unit with additional insulating layers (e.g. of silicone materials) or gaskets to prevent electrical discharges.

Of course, this entails a further increase the manufacturing and installation time and costs.

It is an object of the present invention to provide a LV or MV switching device of the withdrawable type that allows overcoming the above-mentioned problems.

More in particular, it is an object of the present invention to provide a switching device, which provides improved performances in terms of safety.

Another object of the present invention is to provide a switching device, in which the dielectric distances between the powered and earthed portions of the switching device are correctly and constantly set during the assembly of the switching device.

Another object of the present invention is to provide a switching device, which is relatively easy and cheap to manufacture and assembly at industrial level.

In order to achieve these aim and objects, the present invention provides a switching device, according to the following claim 1 and related dependent claims.

In a general definition, the switching device of the invention comprises:
a switching unit comprising one or more electric poles having an insulating casing, said switching device being reversibly movable between an insertion position, at which said switching unit is electrically connected with an electric line, and a withdrawal position, at which said switching unit is electrically disconnected from said electric line;
one or more actuating elements operatively coupleable with an actuating mechanism of a shutter device, which is operatively associated to the switching device, in order to operate one or more shutters of said shutter device during the movement of said switching device.

The aforesaid actuating elements are fixed to said switching unit in order to solidly move with this latter during the movement of the switching device.

In the switching device of the invention, at least one of the aforesaid actuating elements comprises first mechanical connection means for mechanical connection with the insulating casing of at least one of the aforesaid electric poles and the insulating casing of at least one of the aforesaid electric poles comprises second mechanical connection means for mechanical connection with at least one of the aforesaid actuating elements.

In a further aspect, the present invention relates to an electric switchgear panel, according to the following claim 13.

In yet a further aspect, the present invention relates to an actuating element for a switching device, according to the following claim 14.

The aforesaid switching device comprises a switching unit comprising one or more electric poles having each an insulating casing.

The aforesaid switching device is reversibly movable between an insertion position, at which said switching unit is electrically connected with an electric line, and a withdrawal position, at which said switching unit is electrically disconnected from said electric line.

The actuating element of the invention is operatively coupleable with an actuating mechanism of a shutter device, which is operatively associated with said switching device, to operate one or more shutters of said shutter device during the movement of said switching device.

The actuating element of the invention is adapted to be fixed to a switching unit of said switching device in order to solidly move with this latter during the movement of the switching device.

The actuating element of the invention comprises first mechanical connection means for mechanical connection with the insulating casing of an electric pole of the switching unit of said switching device.

In yet a further aspect, the present invention relates to an electric pole for a switching device, according to the following claim 15.

The electric pole of the invention is adapted to be comprised in a switching unit of said switching device.

The aforesaid switching device is reversibly movable between an insertion position, at which said switching unit is electrically connected with an electric line, and a withdrawal position, at which said switching unit is electrically disconnected from said electric line.

The aforesaid switching device comprises one or more actuating elements operatively coupleable with an actuating mechanism of a shutter device, which is operatively associated to the switching device, in order to operate one or more shutters of said shutter device during the movement of said switching device.

The aforesaid actuating elements are fixed to the switching unit of said switching device.

The electric pole of the invention comprises an insulating casing provided with second mechanical connection means for mechanical connection with an actuating element of said switching device.

Further characteristics and advantages of the present invention will emerge from the description of preferred, but not exclusive, embodiments, non-limiting examples of which are provided in the attached drawings, wherein.

Figure 1:
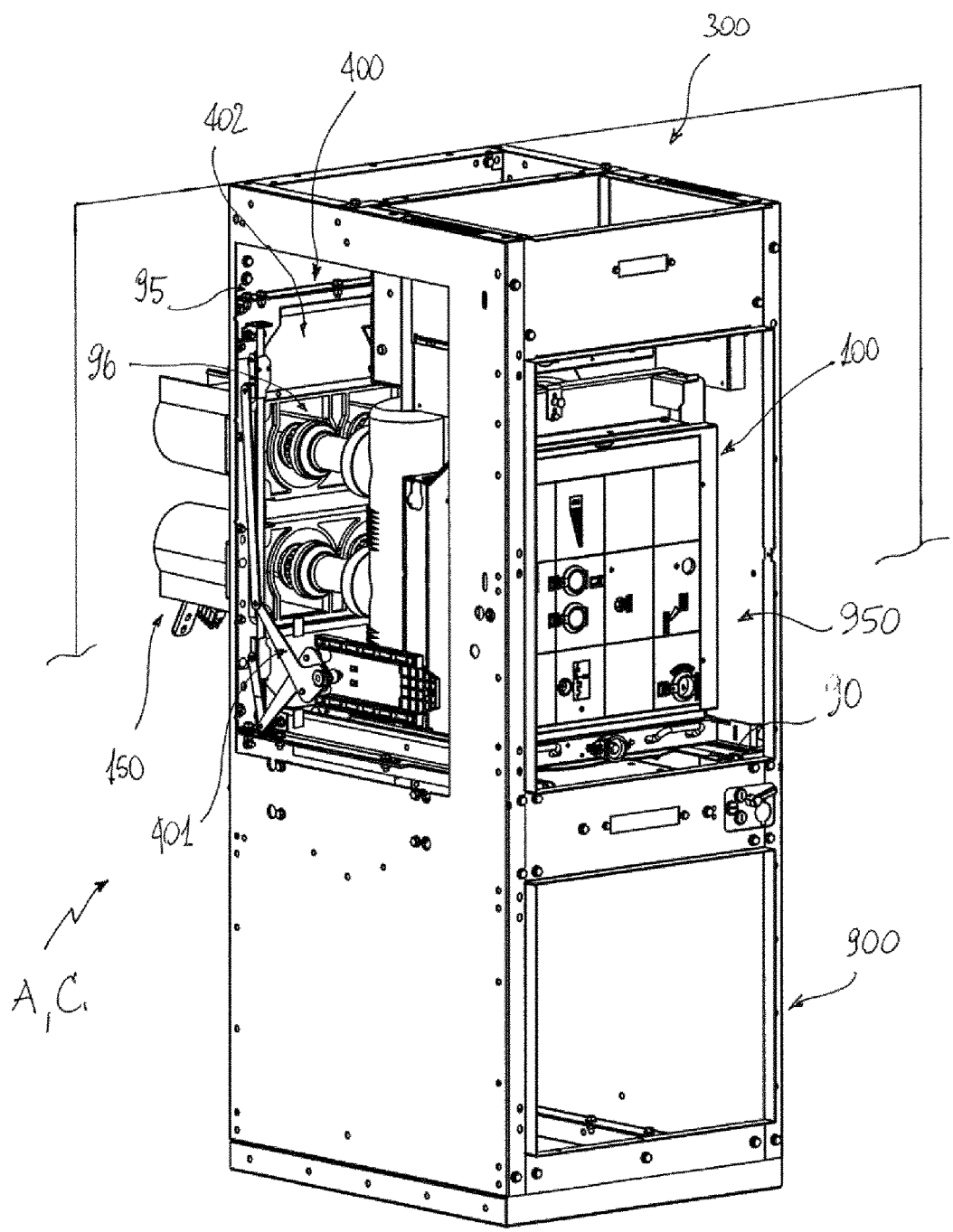
FIGS. 1-2 show schematic views of a cubicle including the switching device, according to the invention.
Figure 2:
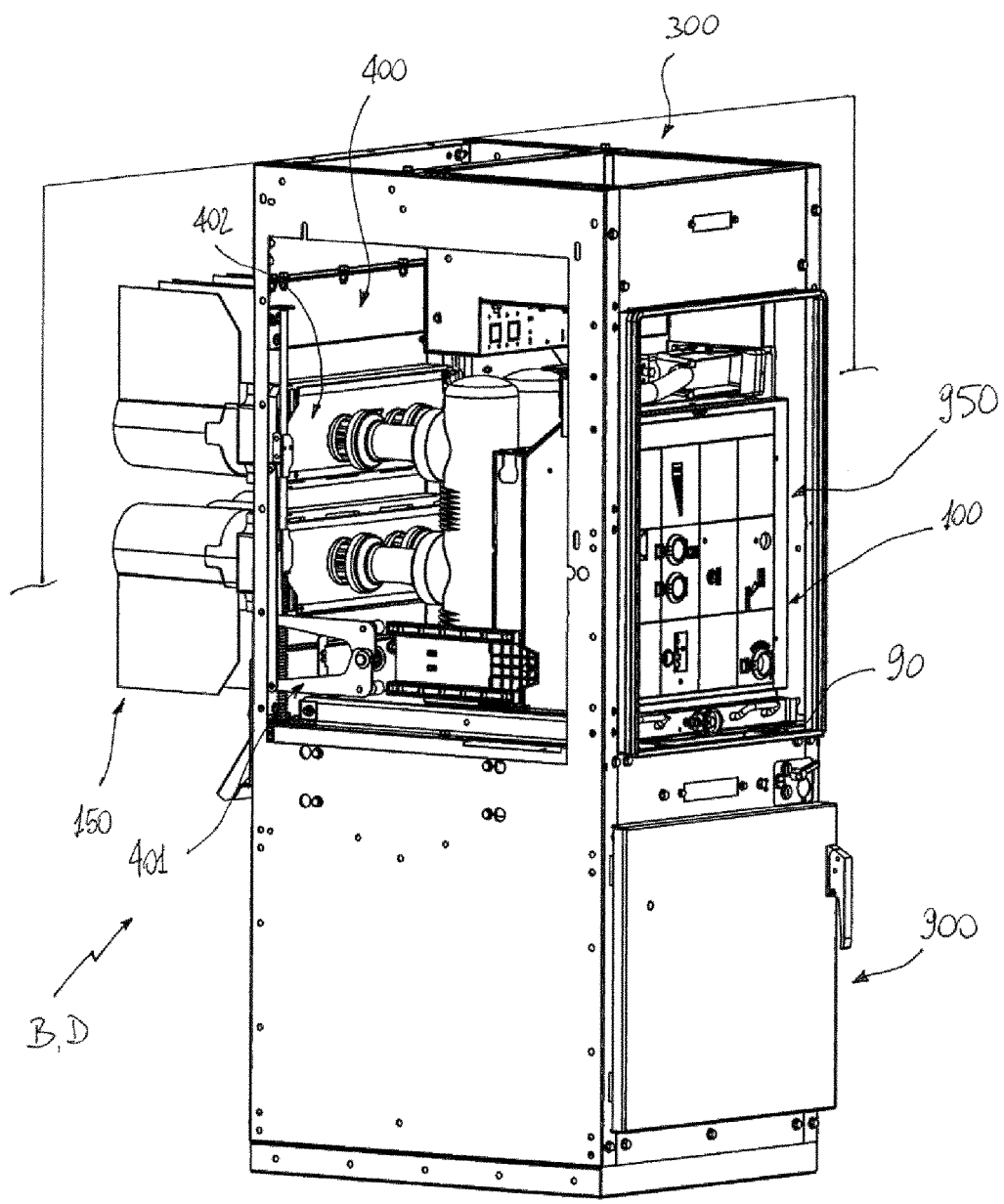
Figure 3:
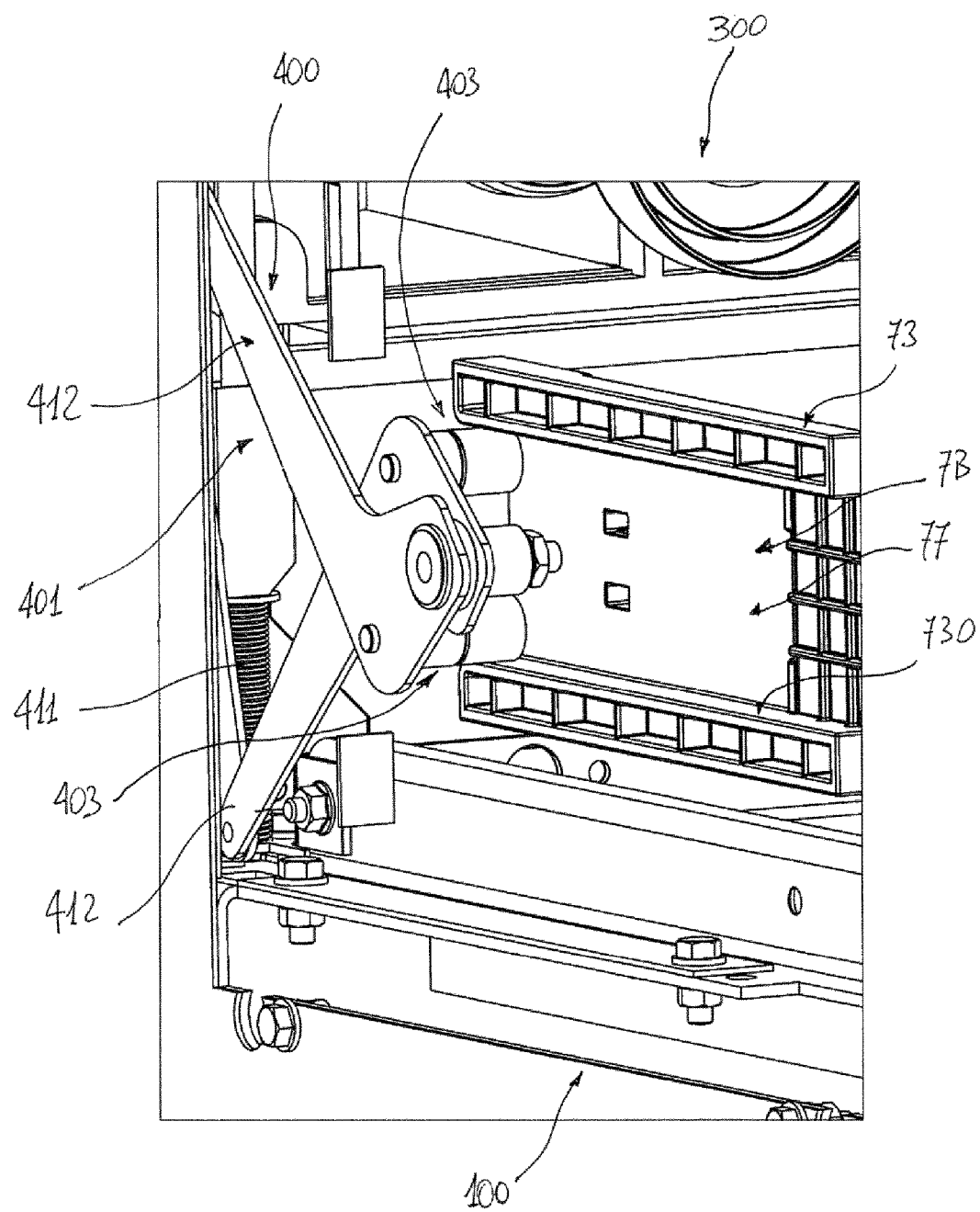
FIG. 3 shows a schematic view of a portion of the cubicle of FIGS. 1-2.

Referring to the cited figures, an aspect of the invention relates to a switching device 100.

The switching device 100 is suitable to be installed in an electric switchgear panel 300.

Advantageously, the switchgear panel 300 comprises a cubicle 900, which may be of known type.

Preferably, the walls of the cubicle 900 define one or more compartments for accommodating various electrical or electronic equipment.

Preferably, the cubicle 900 comprises a compartment 950 for accommodating the switching device 100.

The cubicle 900 is configured to allow the switching device 100 to be connected with an electric line 150.

Preferably, a wall 95 of the cubicle 900, which partially defines the compartment 950, is provided with one or more access apertures 96 to allow the electrical connection of the switching device 100 with an electric line 150.

The switching device 100 comprises a switching unit 2 that comprises one or more electric poles 21A, 21B, 21C.

In the embodiments shown in the cited figures, the switching device 100 is of the three-phase type and the switching unit 2 comprises three electric poles.

Each electric pole 21A, 21B, 21C has at least a fixed switch contact and a movable switch contact (not shown) that can be mutually coupled/separated.

Each electric pole 21A, 21B, 21C comprises an insulating casing 22 made of an electrically insulating material.

The insulating casing 22 of an electric pole defines an internal volume where the electric contacts of the electric pole are arranged, preferably in a suitable arching chamber (not shown).

Preferably, the insulating casing 22 of an electric pole is formed by a shaped elongated cylindrical body that extends along a main extension direction.

Preferably, the insulating casing 22 has a base portion 22C at which each electric pole is mounted on a supporting base 250.

The switching device 100 may be of the gas-insulated type. In this case, the internal volume of each electric pole is filled with an electrically insulating gas, such as $SF_6$.

The switching device 100 may be of the vacuum type. In this case, an arching chamber with vacuum atmosphere is advantageously arranged in the internal volume of each electric pole.

Advantageously, each electric pole 21A, 21B, 21C comprises electric pole terminals 211 for electrical connection with corresponding electric phase terminals of the electric line 150.

Preferably, the pole terminals 211 are supported by corresponding insulating bushings 221 that protrude from the insulating casing 22.

Figure 4:
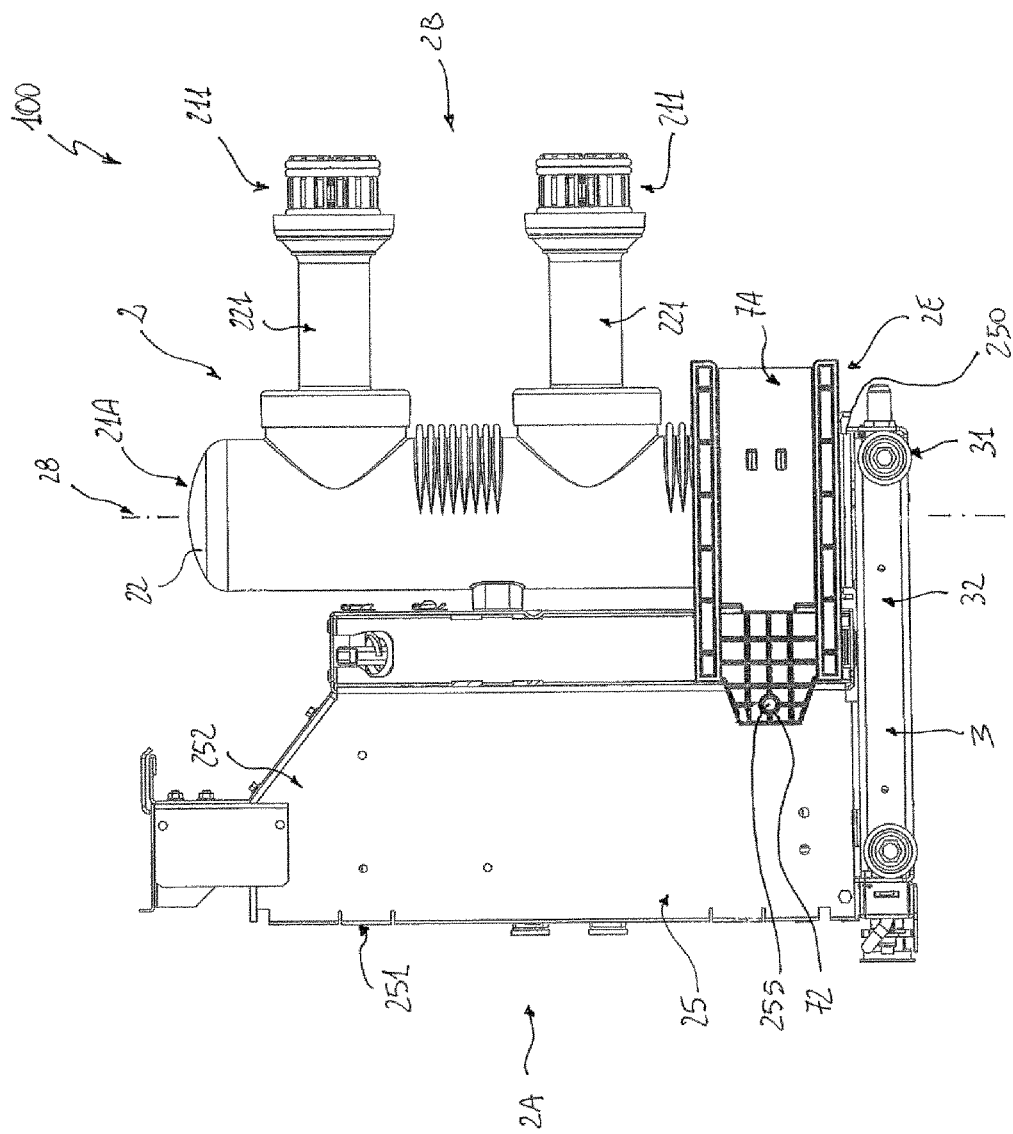
FIGS. 4-6 show schematic views of the switching device, according to the invention.
Figure 5:
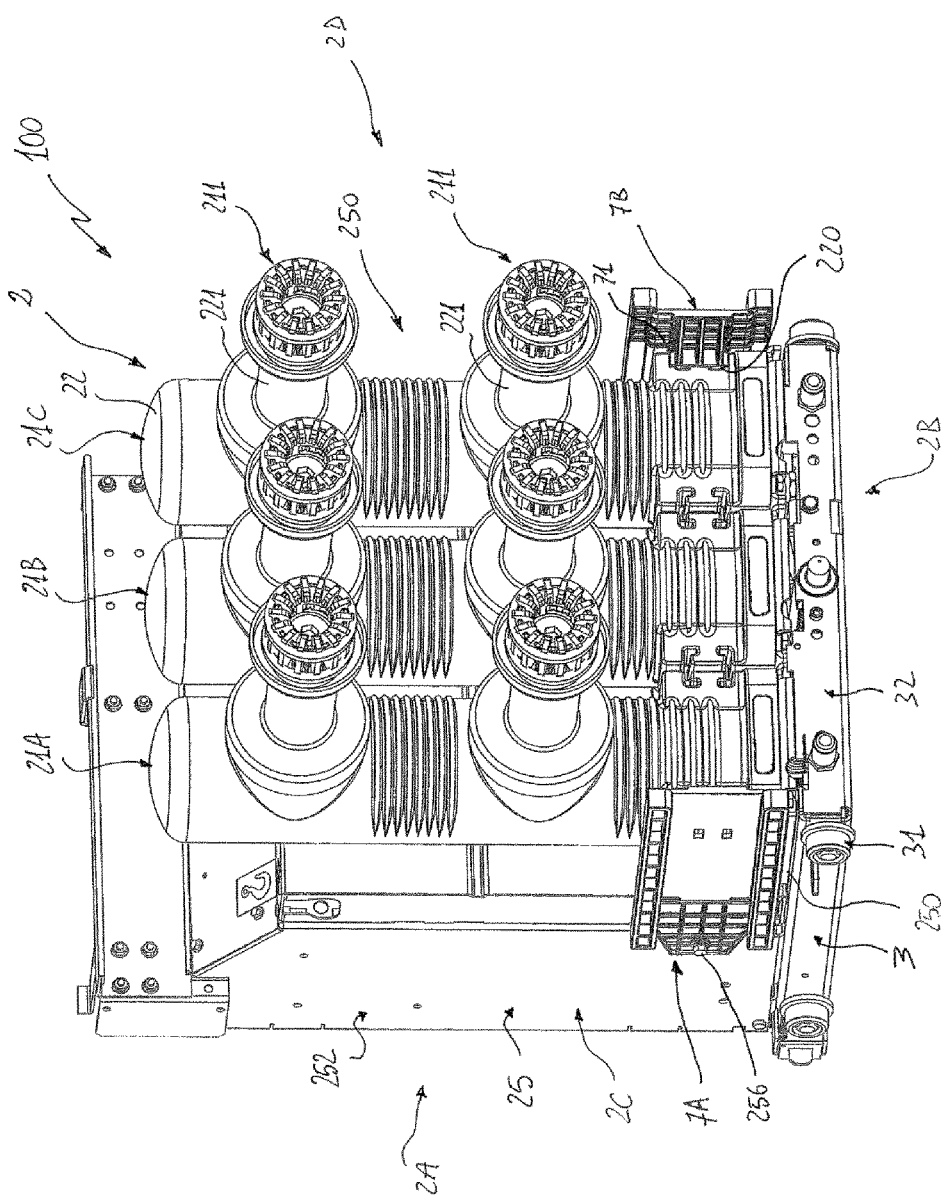
Figure 6:
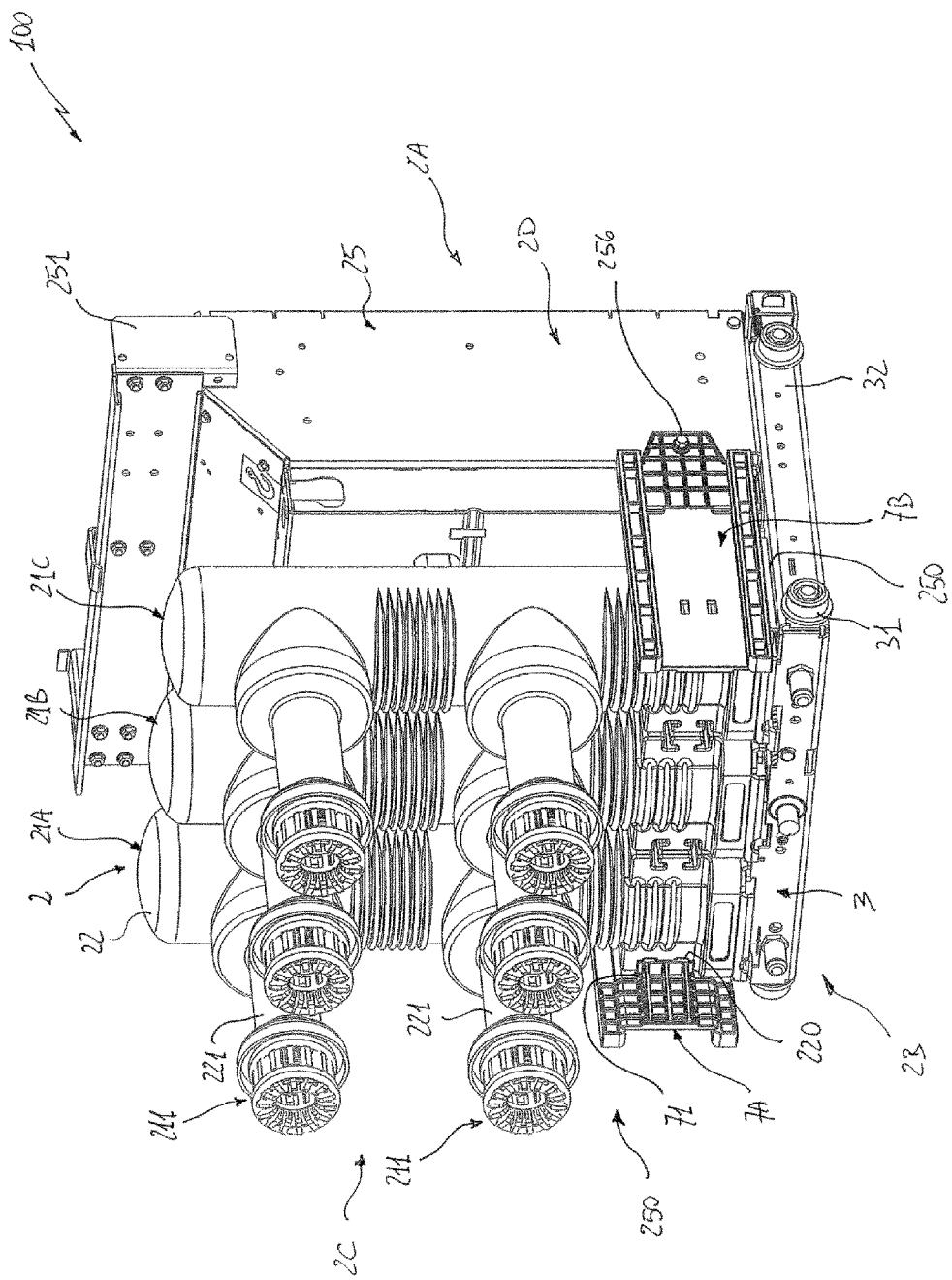

Preferably, the insulating bushings 221 are oriented perpendicularly with respect to a main longitudinal section plane 28 (FIG. 4), which is perpendicular to the supporting base 250 of the electric poles.

Preferably, the switching unit 2 comprises a supporting frame 25.

Preferably, the supporting frame 25 defines the supporting base 250 for mounting of the electric poles 21A, 21B, 21C.

Preferably, the supporting frame 25 defines also a front panel 251 and a casing 252 for accommodating the actuating mechanisms of the electric moving contacts of the electric poles.

When the switching device 100 is installed accommodated in the compartment 950, the front panel 251 and the casing 252 are positioned at a front side 2A of the switching unit 2, in a distal position with respect to the wall 95 of the cubicle 900, whereas the electric poles 21A, 21B, 21C are positioned at a back side 2B of the switching unit 2 in a proximal position with respect to the wall 95 of the cubicle 900.

The switching device 100 is of the withdrawable type, thereby being reversibly movable between an insertion position A, at which the switching unit 2 is electrically connected with an electric line 150, and a withdrawal position B, at which the switching unit 2 is electrically disconnected from the electric line 150.

When the switching device 100 is in the insertion position A, the pole terminals 211 are electrically coupled to the corresponding phase terminals of the electric line 150.

When the switching device 100 is in the withdrawal position B, the pole terminals 211 are electrically disconnected from the phase terminals of the electric line 150.

Preferably, the switching device 1 comprises a truck assembly 3, on which the switching unit 2 is mounted at a lower side 2E.

The truck assembly 3 is movable with respect to a fixed supporting base 90, which is advantageously defined by a further wall of the cubicle 900.

The switching unit 2 is mounted on the truck assembly 3 and has the supporting frame 25 solidly fixed with this latter. In this way, when the truck assembly 3 moves, the switching unit 2 moves solidly with it, according to a translatory movement.

The electric poles 21A, 21B, 21C are mounted on the truck assembly 3 so that the protruding bushings 221 are oriented towards the wall 95 of the cubicle 900, in which the access apertures 96 are defined.

When the switching device 100 is in the insertion position A, the bushings 221 of the electric poles pass through the access apertures 96, so that the pole terminals 211 can electrically couple with the corresponding phase terminals of the electric line 150.

When the switching device 100 is in the withdrawal position B, the bushings 221 do not pass through the access apertures 96 and the pole terminals 211 are positioned at a safety distance from the phase terminals of the electric line 150.

The truck assembly 3 may be of known type and it may comprise a shaped frame 32 that is advantageously provided with external wheels 31 adapted to move along supporting guides (not shown).

The switching device 1 is adapted to be operatively associated with a shutter device 400, which is suitable to be installed in the electric switchgear panel 300.

The shutter device 400 is installed in the same compartment 950, where the switching device 1 is accommodated.

The shutter device 400 comprises one or more shutters 402 that are advantageously arranged at the access apertures 96 of the wall 95 of the cubicle 900.

The shutters 402 are reversibly movable between an opening position C, at which they are retracted to leave the access apertures 96 opened, thereby allowing the switching device 1 to be electrically connected with the electric line 150, and a closing position D, at which they close the access apertures 96, thereby segregating the electric line 150 from the internal volume of the cubicle 900 and providing protection for personnel accessing to the cubicle 900.

The shutter device 400 comprises an actuating mechanism 401 to move the shutters 402 between the mentioned opening and closing positions C, D.

The actuating mechanism 401 may be of known type.

Conveniently, the actuating mechanism 401 is configured in such a way to move the shutters 402 in coordination with the movement of the device 1.

In particular, the actuating mechanism 401 is configured to move the shutters 402 from the closing position D to the opening position C, when the switching device 100 moves from the withdrawal position B to the insertion position A, and to move the shutters 402 from the opening position C to the closing position D, when the switching device 100 moves from the insertion position A to the withdrawal position B.

In this way, it is possible to ensure that the switching device 1 can be electrically connected with the electric line 150, when the switching unit 2 is in the insertion position A, and is electrically segregated from the electric line 150, when the switching unit 2 is in the withdrawal position B.

Preferably, the actuating mechanism 401 is configured to move the shutters 402 from the closing position D to the opening position C upon a mechanical interaction with the switching device 1.

The switching device 1 comprises one or more actuation elements 7A, 7B operatively coupleable with the actuating mechanism 401 to operate the shutters 402 during the movement of the switching device.

The actuating elements 7A, 7B are fixed to the switching unit 2 so that they move solidly with this latter.

Advantageously, the actuating mechanism 401 is substantially in fixed position with respect to the switching unit 2 and the actuating elements 7A, 7B that can move solidly one to another (with a translation movement) with respect to the supporting base 90.

Thanks to the actuating elements 7A, 7B, the switching device 1 can mechanically interact with the actuating mechanism 401 to move the shutters 402 from the closing position D to the opening position C.

When the switching device 100 passes from the withdrawal position B to the insertion position A, the actuating elements 7A, 7B mechanically couple with the actuating mechanism 101 and transmit a force to suitable linking arms 412 of the actuation mechanism 401 in order to move the shutters 402.

When the switching device 100 passes from the insertion position A to the withdrawal position B, the actuating elements 7A, 7B move away from the actuating mechanism 401 and mechanically decouple from this latter.

Suitable return springs 411 of the actuating mechanism 401 move the shutters 402 from the opening position C to the closing position D.

In the embodiments shown the cited figures, the actuating mechanism 401 comprises one or more pairs of actuation rollers 403, each of which is adapted to mechanically couple/decouple with suitable coupling surfaces of a corresponding actuating element 7A, 7B during the movement of the switching device.

Preferably, the switching device 1 comprises a pair of actuating elements 7A, 7B.

Preferably, a first actuating element 7A and a second actuating element 7B are mechanically connected with the switching unit 2 respectively at a first lateral side 2C and at a second lateral side 2D of the switching unit.

According to the invention, at least one actuating element 7A, 7B comprises first mechanical connection means 71 for mechanical connection with the insulating casing 22 of an electric pole 21A, 21B, 21C of the switching unit 2.

According to the invention, the insulating casing 22 of at least an electric pole 21A, 21B, 21C comprises second mechanical connection means 220 for mechanical connection with an actuating element 7A, 7B of the switching device.

The mentioned first and second mechanical connection means 71, 220 allow obtaining a direct mechanical coupling between the actuating elements 7A, 7B and the insulating casing 22 of the corresponding electric poles 21A, 21B, 21C.

This allows positioning the actuating elements 7A, 7B in a predetermined and repeatable manner with respect to the pole terminals 211 of the electric poles.

Preferably, all the actuating elements 7A, 7B of the switching device 100 are provided with the mentioned first mechanical connection means 71.

Preferably, all the electric poles 21A, 21B, 21C of the switching device 100 have an insulating case 22 provided with the mentioned second mechanical connection means 220. However, some embodiments of the inventions, particularly those in which the switching device 100 is of the multi-phase type, may include one or more electric poles of traditional type.

As an example, referring to the cited figures, a possible variant of the three-phase switching device 100 may include an electric pole 21B of traditional type as the insulating casing 22 of such an electric pole has not to be mechanically coupled with an actuating element 7A, 7B.

Preferably, the first mechanical connection means 71 of the actuating elements 7A, 7B are adapted to mechanically connect with the second mechanical connection means 220 of the insulating casing 22 of the electric poles 21A, 21B, 21C.

The provision of a mutual mechanical connection between the first and second mechanical means 71, 220 allows remarkably simplifying the installation operations of the actuating elements 7A, 7B, e.g. without the use of screws.

Preferably, the first mechanical means 71 of the actuating elements 7A, 7B and the second mechanical means 220 of the insulating case 22 of the electric poles 21A, 21B, 21C are geometrically conjugated or complementary one to another.

This solution is quite advantageous as it allows obtaining a robust mechanical connection between an actuating element 7A, 7B and a corresponding electric pole 21A, 21B, 21C.

Preferably, the first mechanical means 71 of the actuating elements 7A, 7B and the second mechanical means 220 of the insulating case 22 of the electric poles 21A, 21B, 21C are arranged so as to realize a mutual mechanical connection of the sliding type, when they are coupled one to another.

This solution further simplifies the installation of the actuating elements 7A, 7B.

Preferably, at least one of the actuating elements 7A, 7B comprises third mechanical connection means 73 for mechanical connection with the supporting frame 25 of the switching unit 2.

Preferably, all the actuating elements 7A, 7B of the switching device 100 are provided with the mentioned third mechanical connection means 73.

Preferably, the supporting frame 25 comprises fourth mechanical connection means 255, 256 for mechanical connection with at least one of the actuating elements 7A, 7B.

Preferably, the actuating elements 7A, 7B comprise fifth mechanical connection means 73 for mechanical connection with the actuating mechanism 401 of the shutter device 400, in particular for mechanical sliding connection with the rollers 403.

Preferably, the actuating elements 7A, 7B are of electrically insulating material.

This solution improves the electrical insulation between the actuating elements 7A, 7B and the pole terminals 211.

Figure 7:
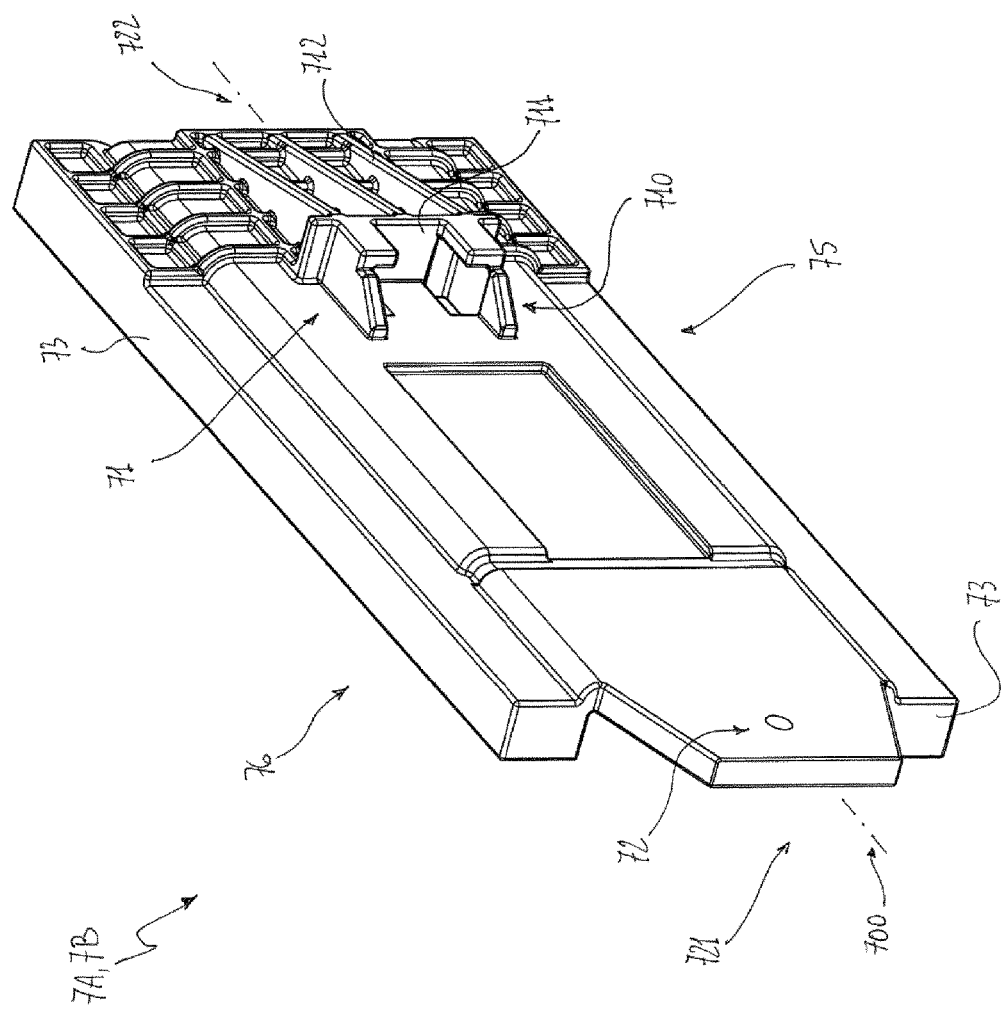
FIGS. 7-8 show schematic views of an actuating element for operating a shutter device in the switching device, according to the invention.
Figure 8:
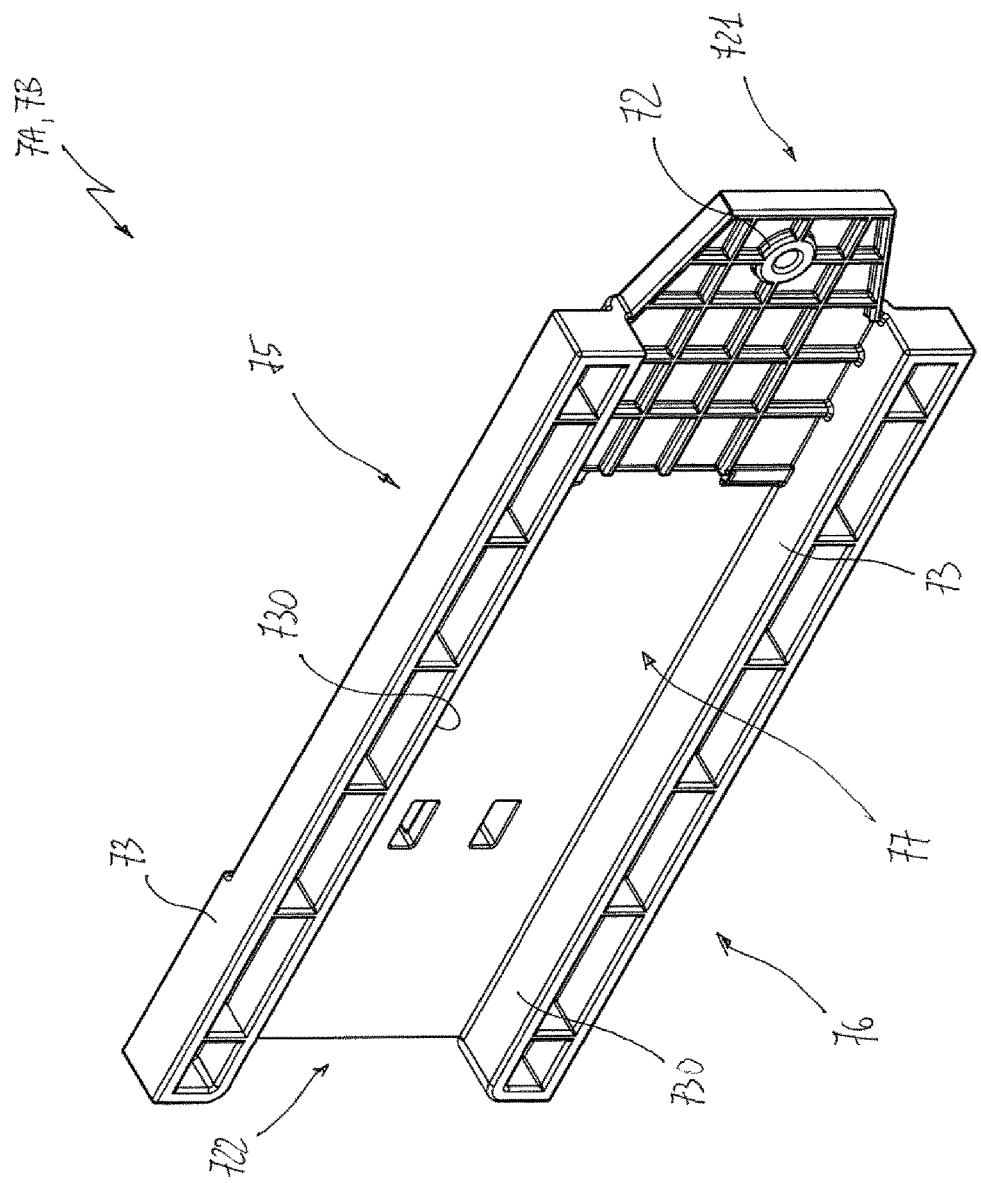
Figure 9:
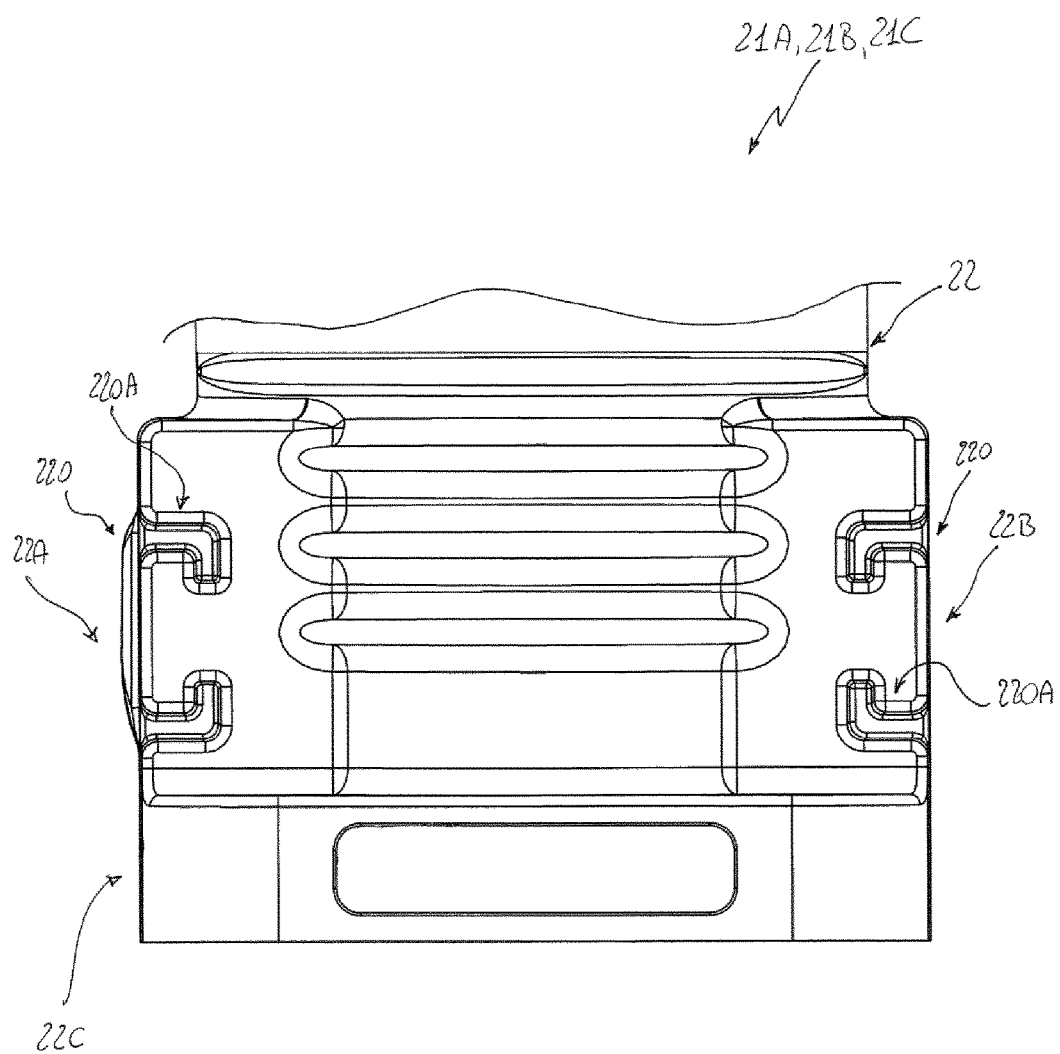
FIG. 9 shows a schematic view of a portion of an electric pole of the switching device, according to the invention.

Preferably, as shown in the cited figures, the actuating elements 7A, 7B of the switching device 100 are formed by actuating chute plates having an elongated shape along a main longitudinal axis 700 (FIG. 7).

Preferably, each actuating chute plate 7A, 7B comprises a first end 721 and a second end 722. Conveniently, when it is fixed to the switching unit 2, each actuating chute plate 7A, 7B has the first and second ends 721, 722 respectively at a proximal and at a distal position with respect to the front panel 251 of the switching unit 2.

In practice, each actuating chute plate 7A, 7B is oriented so as to have its second end 722 directed towards the back side 2B of the switching unit 2.

In this way, when the switching device 1 is accommodated in the compartment 950 of the cubicle 900, each actuating chute plate 7A, 7B has its second end 722 in a proximal position with respect to the actuating mechanism 401 of the shutter device 400.

Preferably, each actuating chute plate 7A, 7B comprises opposite first and second coupling sides 75, 76.

At the first coupling side 75, an actuating chute plate 7A, 7B is coupleable with the switching unit 2 whereas, at the second coupling side 75 an actuating chute 7A, 7B is coupleable with the actuating mechanism 401, in particular with the rollers 403 of this latter.

Preferably, at the first coupling side 75, each actuating chute plate 7A, 7B comprises a coupling protrusion 71, which forms the mentioned first mechanical connection means for mechanical coupling with the insulating casing 22 of an electric pole 21A, 21B, 21C.

Conveniently, the coupling protrusion 71 is positioned at a region proximal to the second end 722 of the actuating chute plate 7A, 7B.

Preferably, the coupling protrusion 71 comprises first protruding walls 710 parallel to the main longitudinal axis 700 of the actuating chute plate 7A, 7B.

Preferably, the first protruding walls 710 are at least partially L-shaped.

Preferably, in a proximal position with respect to the end 722 of the actuating chute plate 7A, 7B, the shaped protrusion 71 comprises a second protruding wall 711 that is perpendicular to the main longitudinal axis 700 of the actuating chute plate 7A, 7B.

Preferably, the first protruding walls 710 join the second protruding wall 712 and extend from the transversal wall 711 towards the end 721 of the actuating shape 7A, 7B.

Preferably, the shaped protrusion 71 comprises multiple third protruding walls 712 that are parallel to the main longitudinal axis 700 of the actuating chute plate 7A, 7B.

Preferably, the third protruding walls 712 are joined to the transversal wall and extend from the transversal wall 711 towards the end 722 of the actuating shape 7A, 7B.

Preferably, as shown in the cited figures, the insulating casing 22 of the electric poles 21A, 21B, 21C comprises one or more coupling sections 220, which form the mentioned second mechanical connection means for mechanical coupling with an actuating element 7A, 7B of the switching device.

Preferably, the insulating casing 22 of each electric pole 21A, 21B, 21C comprises the coupling sections 220 at the base portion 22C.

Preferably, the insulating casing 22 of each electric pole 21A, 21B, 21C comprises a pair of coupling sections 220 at both the sides 22A, 22B defined by the intersections between the insulating case 22 and the longitudinal section plane 28.

This solution is particularly advantageous in a multi-phase switching device, as the insulating case 22 of an electric pole may have a same construction regardless to the positioning the electric pole in the switching unit 2.

Preferably, each coupling section 220 comprises a pair of parallel grooves 220A, which are directed according to directions parallel to the lateral sides 2C, 2D of the switching unit 2, when the electric poles are installed in their normal operative position.

Preferably, the grooves 220A are L-shaped.

Preferably, the shaped protrusion 71 of an actuating chute plate 7A, 7B is geometrically conjugated or complementary with a coupling section 220 of the insulating casing 22 of an electric pole 21A, 21B, 21C.

In particular, the first protruding walls 710 of the protruding section 71 are geometrically conjugated or complementary with the grooves 220A of a coupling section 220 of the insulating casing 22.

Preferably, the shaped protrusion 71 of an actuating chute plate 7A, 7B and the coupling section 220 of the insulating casing 22 of an electric pole 21A, 21B, 21C are mechanically coupleable in a sliding manner to mechanically couple said actuating chute plate with the insulating case of said electric pole.

In order to mechanically couple an actuating chute plate 7A, 7B with the insulating casing 22 of an electric pole 21A, 21B, 21C, the first protruding walls 710 of the protruding section 71 of the actuating chute plate 7A, 7B can be slidingly inserted into the grooves 220A of the insulating casing 22 until the transversal wall 711 of the shaped protrusion 71 abuts the surface of the insulating case 22.

In the embodiments shown in the cited figures, the switching device 100 comprises first and second actuating chute plates 7A, 7B.

The first actuating chute plate 7A is mechanically connected with the insulating casing 22 of the electric pole 21A at the lateral side 2C of the switching unit 2.

To this aim, the coupling protrusion 71 of the actuating chute plate 7A is mechanically coupled with the coupling section 220 of the electric pole 21A, which is in a closer position with respect to the lateral side 2C.

The second actuating chute plate 7B is mechanically connected with the insulating casing 22 of the electric pole 21C at the lateral side 2D of the switching unit 2.

To this aim, the coupling protrusion 71 of the actuating chute plate 7C is mechanically coupled with the coupling section 220 of the electric pole 21C, which is in a closer position with respect to the lateral side 2D.

Preferably, each actuating chute plate 7A, 7B comprises a first connection hole 72, which forms the mentioned third mechanical connection means for mechanical coupling with the supporting frame 25 of the switching unit.

The first connection hole 72 of an actuating chute plate 7A, 7B is arranged so as to pass through the thickness of said actuating chute plate between the coupling sides 75, 76.

Conveniently, the first connection hole 72 is positioned at a region proximal to the first end 721 of the actuating chute plate 7A, 7B.

Preferably, the supporting frame 25 of the switching unit 2 comprises at least a second connection holes 255 and at least a fixing element 256 (e.g. a screw), which form the fourth mechanical connection means for mechanical connection with an actuating element of the switching device.

Each fixing element 256 of the supporting frame 25 is adapted to pass through a corresponding connection hole 72 of an actuating chute plate 7A, 7B and to be received by a corresponding second connection hole 255 of the supporting frame 25.

In this way, each actuating chute plate 7A, 7B can be mechanically connected with the supporting frame 25.

In the embodiments shown in the cited figures, the first and second actuating chute plates 7A, 7B are mechanically connected with the supporting frame 25 at the lateral sides 2C, 2D of the switching unit 2, respectively.

To this aim, fixing elements 256 are inserted through corresponding connection holes 72 of the actuating chute plates 7A, 7B and into corresponding connection holes 255 of the supporting frame 25 respectively at the lateral sides 2C, 2D of the switching unit.

Preferably, each actuating chute plate 7A, 7B comprises protruding edges 73 at the second coupling side 76, which form the fifth mechanical connection means for mechanical connection with the actuating mechanism 401 of the shutter device 400.

Preferably, the protruding edges 73 are shaped so as to be mechanically coupleable in a sliding manner with the actuation rollers 403 of the actuating mechanism 401.

Preferably, the protruding edges 73 are spaced one from another and are provided with mutually facing internal coupling surfaces 730.

Preferably, the protruding edges 73 are rectilinear and parallel to the main longitudinal axis 700.

Preferably, the protruding edges 73 extend between the ends 721, 722 of an actuating chute plate 7A, 7B.

Preferably, the protruding edges 73 are positioned at the sides of an actuating chute plate 7A, 7B to define an intermediate coupling surface 77.

In the embodiments shown in the cited figures, the first and second actuating chute plates 7A, 7B are mechanically coupleable with first and second pairs of rollers 403 at the lateral sides 2C, 2D of the switching unit 2, respectively.

The actuating chute plates 7A, 7B and the corresponding pairs of rollers 403 are mutually positioned so that the rollers 403 have their respective rotation axes perpendicular to the coupling surface 77, when they are coupled with the actuating chute plates 7A, 7B.

Each pair of rollers 403 can thus slide along the internal coupling surfaces 730 while transversely abutting on the coupling surface 77.

In the embodiment shown the cited figures, the first and second pairs of rollers 403 are in a fixed position with respect to the switching device 1 at the sides 2C, 2D of the switching unit 2.

When the switching device 100 passes from the withdrawal position B to the insertion position A, the actuating chute plates 7A, 7B moves towards the rollers 403.

Each pair of rollers 403 couple with the corresponding actuating chute plate 7A, 7B at the ends 722 of these latter and slide along the coupling surfaces 730 of the protruding edges 73.

The actuating chute plates 7A, 7B can thus transmit a force to the linking arms 412 of the actuation mechanism 401 to move the shutters 402 from the closing position D to the opening position C.

When the switching device 100 passes from the insertion position A to the withdrawal position B, the actuating chute plates 7A, 7B moves away from the rollers 403.

Each pair of rollers 403 decouple from the corresponding actuating chute plate 7A, 7B by sliding along the coupling surfaces 730 of the protruding edges 73.

In this case, the shutters 402 are moved by the return springs 411 of the actuating mechanism 401 from the opening position C to the closing position D.

The switching device 100, according to the invention, may be subject to possible variants falling within the scope of the present invention.

According to possible variant embodiments of the invention (not shown), the mentioned first mechanical connection means may be formed by one or more connection holes of the actuating elements 7A, 7B and the mentioned second mechanical connection means may be formed by one or more connection holes of the insulating case 22 of the electric poles 21A, 21B, 21C and by one or more fixing elements (e.g. screws).

Each fixing element is adapted to pass through a corresponding connection hole of an actuating chute plate 7A, 7B and to be received by a corresponding connection hole of the insulating case 22 of an electric pole 21A, 21B, 21C.

According to further possible variant embodiments of the invention (not shown), the mentioned first and second mechanical means may be arranged so as to realize a mutual mechanical connection of the snap-fit type, when they are coupled one to another.

According to further possible variant embodiments of the invention (not shown), the coupling protrusions 71 of the actuating chute plates 7A,7B and the coupling sections 220 of the insulating case 22 of the electric poles 21A, 21B, 21C may be differently configured.

For example, the coupling protrusions 71 may comprise a T-shaped protruding wall 710 adapted to be slidingly inserted into a T-shaped groove 220A of the coupling sections 220.

The switching device, according to the invention, allows achieving the intended aims and objects.

In the switching device according to the invention, the actuating elements 7A, 7B are directly mechanically coupled with the insulating casing 22 of the corresponding electric poles 21A, 21B, 21C.

The actuating elements 7A, 7B are thus positioned at a given fixed position with respect to the pole terminals 211 of the electric poles.

The positioning of the actuating elements 7A, 7B is therefore no more influenced by the mounting mechanical tolerances between the supporting frame 25 and the track assembly 4.

The dielectric distances between the powered and the earthed portions of the switching device 100 are thus constantly predetermined during the assembly of the switching device.

This allows achieving higher levels of safety with respect to the switching devices of the state of the art.

The direct mechanical connection between the actuating elements 7A, 7B and the insulating casing 22 of the corresponding electric poles remarkably simplifies the mounting operations of the actuating elements, which can therefore be installed with simple and quick maneuvers.

The switching device, according to the invention, is therefore easier and less expensive to assembly at industrial level and install on the field with respect to traditional apparatuses.

The invention claimed is:

1. A switching device comprising:
   a switching unit comprising one or more electric poles having an insulating casing, said switching device reversibly movable between an insertion position, at which said switching unit is electrically connected with an electric line, and a withdrawal position, at which said switching unit is electrically disconnected from said electric line;
   one or more actuating elements operatively coupleable with an actuating mechanism of a shutter device to operate one or more shutters of said shutter device during the movement of said switching device, said actuating elements being fixed to said switching unit;
   wherein:
   at least one of said actuating elements comprises first mechanical connection means for mechanical connection with second mechanical connection means of the insulating casing of at least one of said electric poles;
   the insulating casing of at least one of said electric poles comprises the second mechanical connection means for mechanical connection with at least one of said actuating elements.

2. The switching device, according to claim 1, wherein said first and second mechanical connection means are arranged so as to realize a mutual mechanical connection of the sliding type.

3. The switching device, according to claim 1, wherein at least one of said actuating elements comprises third mechanical connection means for mechanical connection with a supporting frame of said switching unit.

4. The switching device, according to claim 1, wherein a supporting frame of said switching unit comprises fourth mechanical connection means for mechanical connection with at least one of said actuating elements.

5. The switching device, according to claim 1, wherein said actuating elements comprise fifth mechanical connection means for mechanical connection with the actuating mechanism of said shutter device.

6. The switching device, according to claim 1, wherein said actuating elements are constituted by actuating chute plates having an elongated shape and opposite first and second coupling sides for coupling with said switching unit and with the actuating mechanism of said shutter device, respectively.

7. The switching device, according to claim 6, wherein said actuating chute plates comprise a coupling protrusion at said first coupling side, said coupling protrusion forming said first mechanical connection means.

8. The switching device, according to claim 6, wherein the insulating casing of at least one of said electric poles comprises at least a coupling section, said coupling section forming said second mechanical connection means.

9. The switching device, according to claim 7, wherein said coupling protrusion is geometrically conjugated or complementary with said coupling section.

10. The switching device, according to claim 1, wherein it comprises:
    a first actuating element, which is mechanically connected with a first electric pole of said switching unit at a first lateral side of said switching unit;
    a second actuating element, which is mechanically connected with a second electric pole of said switching unit at a second lateral side of said switching unit.

11. An electric switchgear panel further comprising a switching device according to claim 1.

12. An actuating element for a switching device,
    wherein said switching device comprises a switching unit comprising one or more electric poles having an insulating casing,
    wherein said switching device is reversibly movable between an insertion position, at which said switching unit is electrically connected with an electric line, and a withdrawal position, at which said switching unit is electrically disconnected from said electric line,
    wherein said actuating element is operatively coupleable with an actuating mechanism of a shutter device to operate one or more shutters of said shutter device during the movement of said switching device,
    wherein said actuating element is adapted to be fixed to said switching unit;
    wherein said actuating element comprises first mechanical connection means for mechanical connection with the insulating casing of an electric pole of said switching unit.

13. An electric pole for a switching device,
    wherein said electric pole has an insulating casing,
    wherein said electric pole is adapted to be comprised in a switching unit of said switching device,
    wherein said switching device is reversibly movable between an insertion position, at which said switching unit is electrically connected with an electric line, and a withdrawal position, at which said switching unit is electrically disconnected from said electric line,
    wherein said switching device comprises one or more actuating elements operatively coupleable with an actuating mechanism of a shutter device to operate one or more shutters of said shutter device during the movement of said switching device, wherein said actuating elements are fixed to said switching unit;

wherein the insulating casing of said electric pole comprises second mechanical connection means for mechanical connection with an actuating element of said switching device.

14. The switching device, according to claim 2, wherein at least one of said actuating elements comprises third mechanical connection means for mechanical connection with a supporting frame of said switching unit.

15. The switching device, according to claim 14, wherein a supporting frame of said switching unit comprises fourth mechanical connection means for mechanical connection with at least one of said actuating elements.

16. The switching device, according to claim 15, wherein said actuating elements comprise fifth mechanical connection means for mechanical connection with the actuating mechanism of said shutter device.

17. The switching device, according to claim 16, wherein said actuating elements are constituted by actuating chute plates having an elongated shape and opposite first and second coupling sides for coupling with said switching unit and with the actuating mechanism of said shutter device, respectively.

18. The switching device, according to claim 17, wherein it comprises:
- a first actuating element, which is mechanically connected with a first electric pole of said switching unit at a first lateral side of said switching unit;
- a second actuating element, which is mechanically connected with a second electric pole of said switching unit at a second lateral side of said switching unit.

* * * * *